US011650343B2

(12) United States Patent
Bekara

(10) Patent No.: US 11,650,343 B2
(45) Date of Patent: May 16, 2023

(54) DIRECTIONAL DESIGNATURE OF MARINE SEISMIC SURVEY DATA

(71) Applicant: PGS Geophysical AS, Oslo (NO)

(72) Inventor: Maiza Bekara, Kingston Upon Thames (GB)

(73) Assignee: PGS Geophysical AS, Oslo (NO)

( * ) Notice: Subject to any disclaimer, the term of this patent is extended or adjusted under 35 U.S.C. 154(b) by 235 days.

(21) Appl. No.: 16/800,828

(22) Filed: Feb. 25, 2020

(65) Prior Publication Data

US 2020/0333491 A1 Oct. 22, 2020

Related U.S. Application Data

(60) Provisional application No. 62/835,110, filed on Apr. 17, 2019.

(51) Int. Cl.
*G01V 1/38* (2006.01)
*G01V 1/30* (2006.01)

(52) U.S. Cl.
CPC .............. *G01V 1/3808* (2013.01); *G01V 1/30* (2013.01); *G01V 2210/56* (2013.01); *G01V 2210/57* (2013.01)

(58) Field of Classification Search
CPC .... G01V 1/3808; G01V 1/30; G01V 2210/56; G01V 2210/57
See application file for complete search history.

(56) References Cited

U.S. PATENT DOCUMENTS

| 7,379,386 B2 * | 5/2008 | Muyzert ................. G01V 1/38 367/63 |
| 8,775,091 B2 * | 7/2014 | Robertsson ............. G01V 1/30 367/73 |
| 9,030,910 B2 * | 5/2015 | Ozbek .................... G01V 1/364 367/24 |
| 9,395,457 B2 * | 7/2016 | Poole ...................... G01V 1/38 |

(Continued)

FOREIGN PATENT DOCUMENTS

EP 2696217 2/2014

OTHER PUBLICATIONS

Joseph Jennings and Shuki Ronen, "Using Mie scattering theory to debubble seismic airguns," SEP160; Sep. 13, 2013, 17 pages.

(Continued)

*Primary Examiner* — Alexander Satanovsky
*Assistant Examiner* — Lynda Dinh

(57) ABSTRACT

Recorded seismic data includes seismic traces having respective source orientation angles, where the source orientation angles represent deviations in seismic source orientation relative to an inline survey direction. A plurality of designature operators corresponding to respective designature orientation angles within a defined set of designature orientation angles may be generated. For a given member of the defined set of designature orientation angles, a corresponding designature operator may be applied to the recorded seismic data to generate designatured seismic data for the given designature orientation angle. For a given seismic trace having a given source orientation angle, the designatured seismic data may be interpolated to generate a designatured version of the given seismic trace. The results may be stored in a tangible, computer-readable medium.

25 Claims, 11 Drawing Sheets

(56) References Cited

U.S. PATENT DOCUMENTS

| | | | |
|---|---|---|---|
| 2014/0050049 A1* | 2/2014 | Kitchenside | G01V 1/36 367/24 |
| 2014/0064027 A1* | 3/2014 | Winnett | G01V 1/3808 367/24 |
| 2016/0178774 A1* | 6/2016 | Kluever | G01V 1/36 367/24 |
| 2016/0349392 A1 | 12/2016 | Lecerf | |
| 2016/0349394 A1 | 12/2016 | Lecerf | |
| 2018/0356547 A1* | 12/2018 | Tonellot | G01V 1/282 |

OTHER PUBLICATIONS

Jack Kinkead and Jon Burren, "Application of a Full 3-D Designature Solution to a Wide Azimuth Survey," SEG International Exposition and 87th Annual Meeting; 2017, pp. 5511-5515.

P. Kristiansen et al., "Deepwater OBN and Source Designature—Using the Information in the Data and Improving the Processing," 77th EAGE Conference & Exhibition 2015, IFEMA Madrid, Spain, Jun. 1-4, 2015, 5 pages.

Chang-Chun Lee, et al., "Directional designature using a bootstrap approach," SEG Denver 2014 Annual Meeting, pp. 4253 4257.

Gordon Poole et al., "Shot-to-shot directional designature using near-field hydrophone data," SEG Houston 2013 Annual Meeting, pp. 4236-4240.

G. Poole, et al., "3D Source Designature Using Source-receiver Symmetry in the Shot Tau-px-py Domain," 77th EAGE Conference & Exhibition 2015, IFEMA Madrid, Spain, Jun. 1-4, 2015, 5 pages.

Biondi, "3D Seismic Imaging," Chapter 6 (SEG 2006), 28 pages.

SEG Wiki, "Ghost" (as downloaded from https://wiki.seg.org/wiki/Dictionary:Ghost on Jul. 8, 2022).

SEG Wiki, "Deghosting" (as downloaded from https://wiki.seg.org/wiki/Deghosting on Jul. 8, 2022).

* cited by examiner

DIRECTIONAL DESIGNATURE OF MARINE SEISMIC SURVEY DATA

CROSS-REFERENCE TO RELATED APPLICATIONS

This application claims priority to U.S. Provisional Patent Application No. 62/835,110, filed on Apr. 17, 2019, which is hereby incorporated by reference in its entirety.

BACKGROUND

Geophysical surveys are often used for oil and gas exploration in geophysical formations, which may be located below marine environments. Various types of signal sources and geophysical sensors may be used in different types of geophysical surveys. Seismic geophysical surveys, for example, are based on the use of seismic waves. In marine seismic surveys, a survey vessel may tow one or more sources (e.g., air guns, marine vibrators, etc.) and one or more streamers along which a number of sensors (e.g., hydrophones and/or geophones) are located.

An ideal seismic source would emit energy symmetrically from a single point in space. As a consequence of this theoretical symmetry, reflections obtained from such a source would be insensitive to source orientation. In practice, however, the output of seismic sources does exhibit some degree of directional dependence (i.e., anisotropy), which can introduce noise or distortion (commonly referred to as a "source signature" or simply "signature") to seismic data. Embodiments of this disclosure may be used to ameliorate source signature effects, as discussed below.

DETAILED DESCRIPTION

This disclosure initially describes, with reference to FIGS. 1A-B and 2A-B, an overview of a geophysical survey system that exhibits source anisotropy that can contribute signature effects to seismic data. It then describes, with reference to FIGS. 3-5, techniques for performing designature of seismic data. Data visualizations that illustrate a simulated application of the designature techniques are discussed with respect to FIGS. 6-9. Finally, an example computing system is described with reference to FIG. 10.

Survey Overview

Figure 1A:
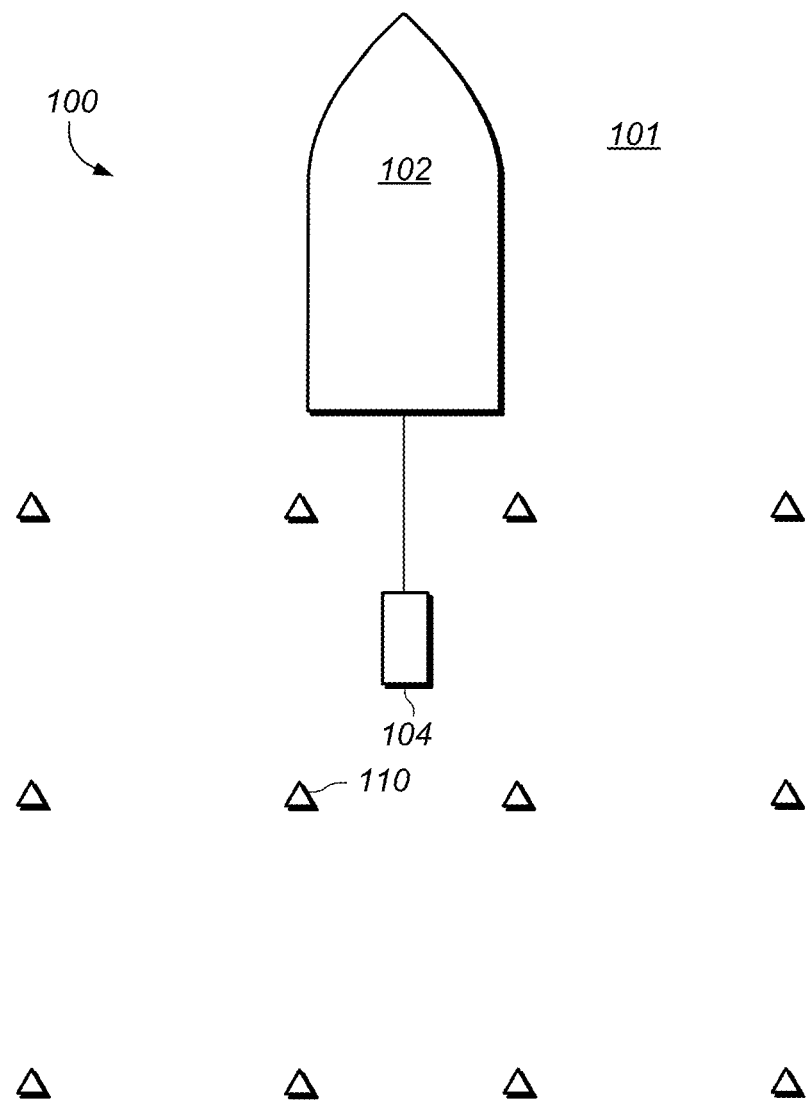
FIGS. 1A-B illustrate overhead and profile views (not necessarily to scale) of a marine survey system.
Figure 1A:
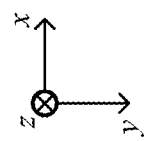
Figure 1B:
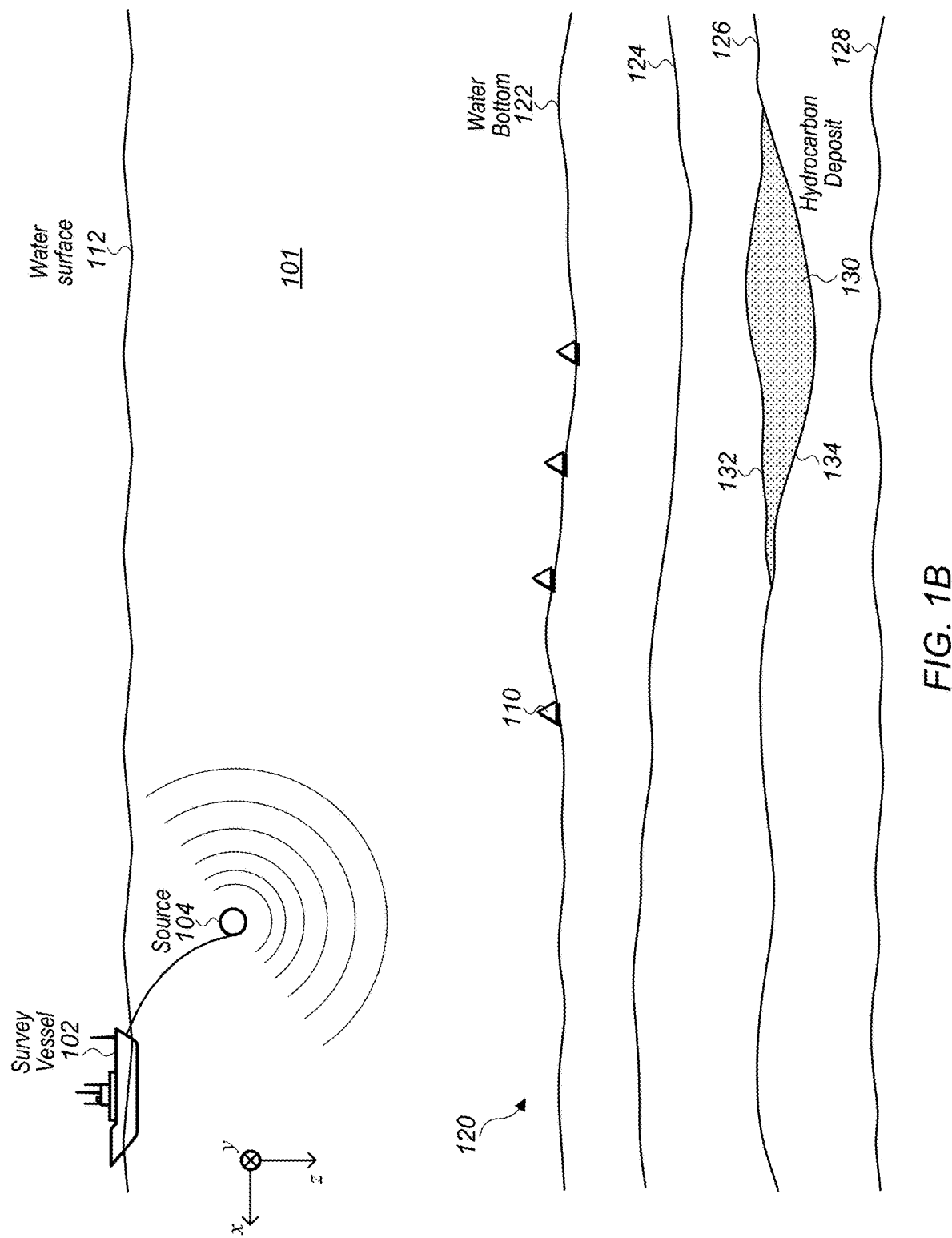

FIGS. 1A-1B illustrate overhead and profile views (not necessarily to scale) of a marine survey system configured to operate with sensor devices located along the water bottom. In FIG. 1A, system 100 includes survey vessel 102, which is configured to move along a surface of a body of water 101 such as a lake, sea, ocean, or other water body. In the illustrated embodiment, survey vessel 102 tows signal source 104, which may include any suitable source of seismic energy such as airgun(s), vibrator(s), or the like. In some embodiments, multiple signal sources 104 may be employed.

Additionally, system 100 includes a number of water-bottom sensors 110 distributed along the bottom of water body 101. As used herein, the term "water-bottom sensor" refers to any suitable type of seismic sensor, such as a pressure and/or particle motion sensor (e.g., a hydrophone and/or geophone), configured for deployment along the bottom of a water body in which a survey is to be conducted. The term "water-bottom sensor" includes devices referred to in the art as ocean-bottom sensors (OBS), ocean-bottom nodes (OBN), and ocean-bottom cables (OBC, also colloquially referred to as "nodes on a rope"). While these devices include "ocean" in their names, it is understood that they may be deployed in any suitable body of water, whether fresh or saline.

FIG. 1A includes coordinate axes corresponding to the illustrated view. In FIG. 1A, the x-axis is parallel to the ideal sail-line direction of survey vessel 102 (i.e., the assumed pre-plot sail line uninfluenced by cross-currents or other deviations) and is also referred to as the inline direction. The y-axis is perpendicular to the inline direction and is also referred to as the crossline direction. The view of FIG. 1A is oriented along the z-axis, which is also referred to as depth.

FIG. 1B illustrates additional aspects of the environment in which system 100 may be deployed, as well as relationships among system elements not visible in FIG. 1A. As the coordinates show, FIG. 1B is a profile view along the y-axis or crossline direction. The x-axis or inline direction is illustrated left to right, and the z-axis or depth is shown vertically.

In particular, FIG. 1B shows water surface 112 as well as water bottom 122, along which water-bottom sensors 110 are deployed. Water bottom 122 represents a top surface of the subterranean formation 120 located at the bottom of the body of water. The subterranean formation 120 is composed of a number of subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by analysis of seismic data collected during a marine seismic survey.

During the course of a marine seismic survey, vessel 102 may traverse the area in which water-bottom sensors 110 are deployed, firing signal source 104 at selected intervals. The resulting acoustic energy propagates downward through the water and reflects off of various features within subterranean formation 120. The direct arrival of acoustic energy as well as seismic reflections from geological features are detected and recorded by water-bottom sensors 110. In some embodiments, sensor data recorded by water-bottom sensors 110 may be locally stored (e.g., within solid-state memory or a suitable magnetic or optical recording medium) until water-bottom sensors 110 are retrieved from water bottom 122. In other embodiments, water-bottom sensors 110 may be configured to transmit their recorded data while still deployed on water bottom 122, either continuously or on demand. For example, vessel 102 may include a recording system (not shown) configured to collect data from water-bottom sensors 110 either through proximate connection (physical or wireless) after sensor retrieval, or remotely while water-bottom sensors 110 remain deployed.

Vessel 102 may also be configured to record the position of source 104 (e.g., its x, y, and z coordinates in absolute terms or relative to some defined frame of reference) at the various times of its actuation during the survey, as well as any deviation of the orientation of source 104 from the nominal orientation (e.g., the inline direction). Such information may be derived, for example, via Global Positioning System (GPS) detection, acoustic ranging, hydrostatic pressure detection, or other suitable techniques for position determination. As discussed below, such source position information may be combined with the data collected by water-bottom sensors 110 to correct for errors that may be introduced by deviation of source 104 from its nominal orientation.

While not shown in FIGS. 1A-1B, it is possible for towed streamers to be used in conjunction with water-bottom sensors. For example, either vessel 102 or a different vessel may tow one or more streamers that include sensors (e.g., hydrophones, geophones, or other sensor types) distributed along the streamer length. Such streamers may also include streamer steering devices (also referred to as "birds") configured to provide selected lateral and/or vertical forces to the streamers as they are towed through the water, typically based on wings or hydrofoils that provide hydrodynamic lift. The vessel towing the streamers may provide recording equipment for storing the data captured by streamer sensors, which may be the same as or separate from the recording equipment used to store the data captured by water-bottom sensors.

Each of signal sources 104 may include sub-arrays of multiple individual signal sources. For example, a signal source 104 may include a plurality of air guns, marine vibrators, or other seismic sources. Moreover, it is noted that in various embodiments, a "source" as used in the multi-source survey discussion below may include: an array of individual signal sources; one or more individual elements of an array of signal sources; or multiple individual elements of different arrays of signal sources. That is, a "source" may correspond to an individual signal source or to various combinations of signal sources, variously distributed.

Designature Workflow to Correct for Source Anisotropy

If source 104 behaved as an ideal point source, it would radiate all of its emitted energy symmetrically from a single point, and thus rotation of the source would have no discernible effect on how the source energy is received at receivers such as water-bottom sensors 110. In many practical applications, however, source 104 includes a number of discrete elements that are located in proximity to one another. For example, source 104 may include a plurality of elements (e.g., airguns, vibrators, or other sources of seismic energy) that are individually tuned to produce the desired frequencies of acoustic energy. Depending on the design complexity of source 104 (e.g., the desired range of output frequencies and their amplitudes), the individual elements may be distributed at distances on the order of meters from each other.

The distribution of source elements in space creates the potential for anisotropic source behavior. That is, unlike an ideal point source that emits energy symmetrically from a single point, the energy received at a receiver from an anisotropic source may vary depending on the orientation of the source relative to the receiver. Generally speaking, the effect of different source orientations on the energy received by a receiver is referred to herein as "signature." Correction of these effects—e.g., to remove directional effects from a signal, causing it to more closely resemble a signal that was originally generated by an ideal point source—is referred to herein as "designature."

Seismic data obtained from water-bottom sensors like those discussed with respect to FIGS. 1A-B may be particularly susceptible to directional source effects, because of the large range of offsets employed in such surveys. Accordingly, correcting for source array directivity by applying a designature methodology may show particular benefits for surveys employing water-bottom sensors, particularly in the case of 4D surveys (in which a given area is surveyed repeatedly over time, for example to observe how hydrocarbon deposits migrate over time during production from reservoirs). However, the designature techniques discussed herein are not limited to surveys employing water-bottom sensors, but may be applied in any suitable context, including in towed streamer surveys, for example.

Figure 2A:
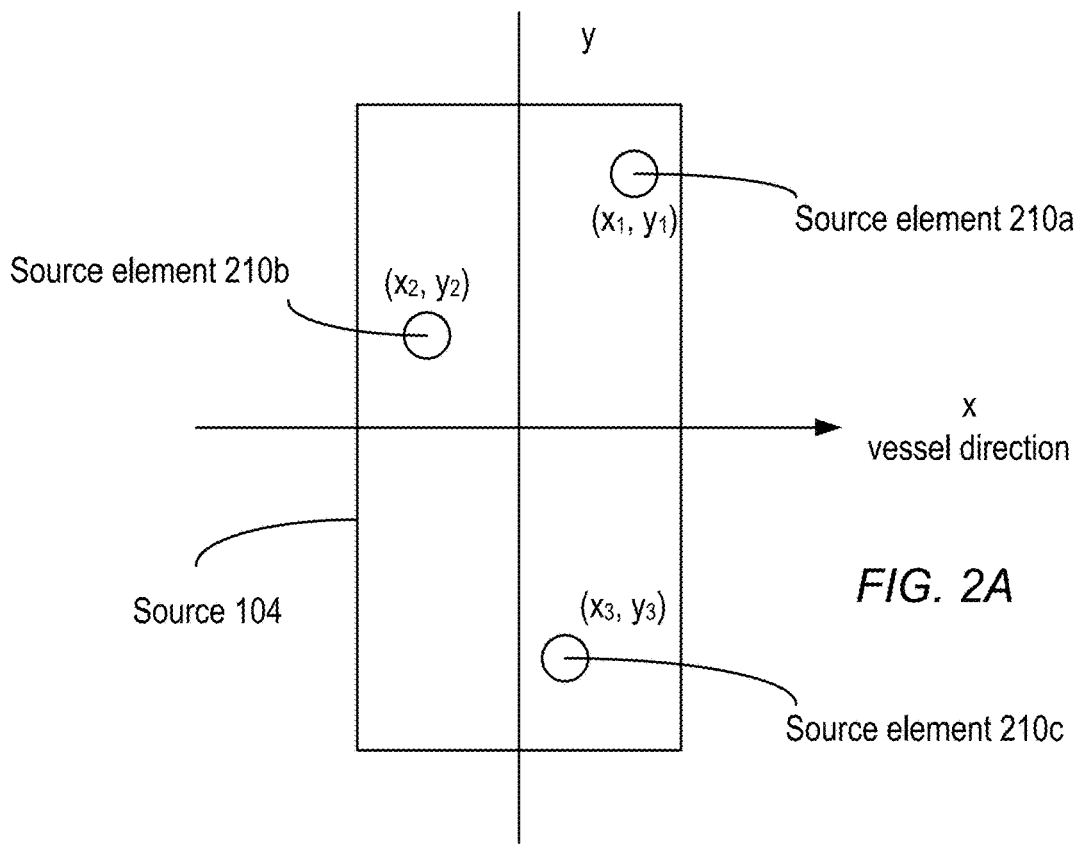
FIGS. 2A-B illustrate examples of how a complex seismic source can exhibit anisotropy.
Figure 2B:
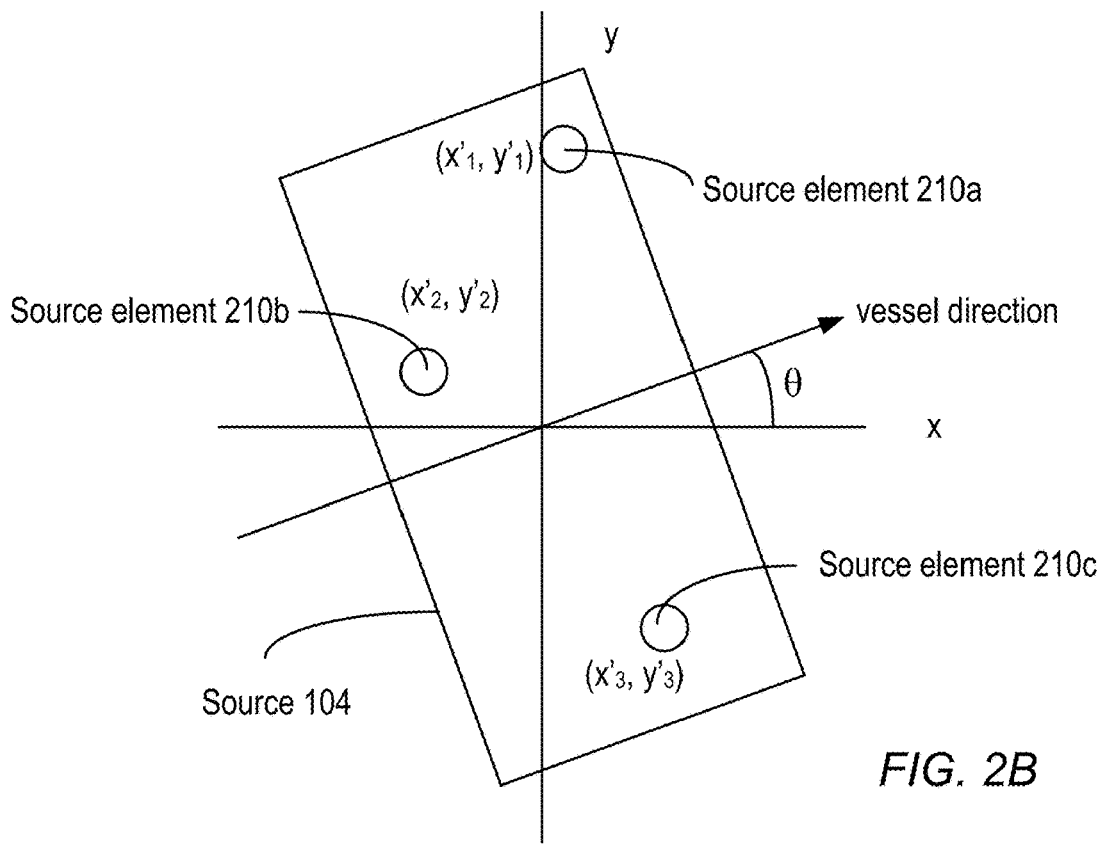

FIGS. 2A-B illustrate an example of how a complex source can exhibit anisotropy. In FIG. 2A, an embodiment of source 104 is shown to include three source elements 210a-c that are located in three different positions relative to a set of x-y axes, denoted by the survey grid. Here, the x-y axes are assumed to align with a survey pattern established with respect to water-bottom sensors 110, where the preplot inline direction for the survey is determined to be in the direction of the x-axis and the subline direction to be in the direction of the y-axis. (Here, the vessel direction for the survey may be considered the crossline direction with respect to the receiver array, although different vessel orientations with respect to the subline and crossline directions of the receiver array are possible.) In the configuration shown in FIG. 2A, the position of each of source elements 210a-c can be identified by a respective pair of coordinates $(x_1, y_1)$, $(x_2, y_2)$, and $(x_3, y_3)$.

FIG. 2B illustrates an instance in which source 104 is being towed at an angle θ relative to the x-axis of a given survey grid. It can be seen that source elements 210a-c have assumed new positions relative to the survey grid, denoted by coordinates $(x'_1, y'_1)$, $(x'_2, y'_2)$, and $(x'_3, y'_3)$. These new positions change the relationship between individual source elements 210a-c and the geophysical features that reflect seismic energy emitted by those elements, altering the reflected energy relative to the configuration of FIG. 2A. It is noted that the x-y plane is not the only plane in which source 104 may exhibit anisotropy. For example, if individual source elements are disposed at different depths, it is possible for source 104 to exhibit anisotropy in the y-z plane and/or x-z planes, for example if source 104 tilts or otherwise deviates in its vertical orientation. While the following discussion develops a designature procedure with respect to rotation of source 104 in the x-y plane, it is understood that the procedure discussed below could be expressed in terms of different planes.

In a particular embodiment, the rotational effects of towing source 104 at a nonzero angle relative to the x-axis can be expressed as follows. First, assume that there exist N source elements 210 individually denoted $s_n(t)$, where each source element 210 has a corresponding delay time $\tau_n$ and coordinates $(x_n, y_n, z_n)$ that represent the source element position in the nominal source orientation (i.e., when source 104 is oriented in the direction of the survey with θ=0, as in FIG. 2A). Here, delay time $\tau_n$ represents the relative delay in actuation of a particular source element 210 relative to activation of source 104, and is typically on the order of milliseconds, but could have arbitrarily larger values in other cases depending on the application. Additionally, assume that $s_n(t)$ and $\tau_n$ are consistent (e.g., invariant) over the course of a survey, and that the source array orientation angle θ is known and available throughout the survey (e.g., derived from vessel position information, such as via GPS, and stored in the header for each trace in the receiver gathers).

Given these, for a given source array orientation angle θ, the signature operator in the 3D frequency domain (i.e., the frequency-wavenumber domain) without accounting for the source ghost can be formulated as:

$$S_\theta(f, k_x, k_y) = \sum_{n=1}^{N} S_n(f) e^{-j2\pi k_x(\cos\theta x_n + \sin\theta y_n)} e^{-j2\pi k_y(-\sin\theta x_n + \cos\theta y_n)} e^{-j2\pi k_z z_n} e^{-j2\pi f \tau_n}$$

As just noted, this formulation does not attempt to reflect the contribution of the source ghost (i.e., the reflection of source energy from the sea surface prior to being received). In some embodiments, source deghosting and designature may be performed as separate operations, while in other embodiments these procedures can be combined. A formulation of the signature operator that includes the source ghost term may be given as:

$$S_\theta(f, k_x, k_y) = \sum_{n=1}^{N} (S_n(f) e^{-j2\pi k_x(\cos\theta x_n + \sin\theta y_n)} \\ e^{-j2\pi k_y(-\sin\theta x_n + \cos\theta y_n)} * (1 - R(f) e^{j2\pi k_z(2z_n)}) e^{-j2\pi k_z z_n} e^{-j2\pi f \tau_n})$$

where R (f) denotes the frequency-dependent sea-surface reflectivity. The notational convention of the z-axis assumes that positive depths are above the sea-surface. For both formulations, the depth (i.e., z-axis) wavenumber component may be derived as follows:

$$k_z = \sqrt{\left(\frac{f}{v_w}\right)^2 - k_x^2 - k_y^2}$$

where $v_w$ denotes the velocity of seismic energy in water (which may vary based on water conditions, such as temperature and salinity).

Having derived a representation of the signature operator, the designature operator in the 3D frequency domain may be given for a particular source array orientation angle θ as:

$$H_\theta(f, k_x, k_y) = \frac{W_d(f) S_\theta(f, k_x, k_y)^*}{|S_\theta(f, k_x, k_y)|^2 + \epsilon}$$

Here, * denotes the complex conjugate operator, and E is a small positive constant selected to ensure a nonzero denominator (to avoid division by zero). Moreover, $W_d(f)$ denotes the frequency-domain representation of the desired output wavelet (i.e., the output wavelet free from signature distortion), which in various embodiments may be supplied by the user (e.g., in the form of a target wavelet) or computed from the source elements as the far field signature (e.g., $S_\theta(f, 0,0)$). Multiple designature operators may be defined for multiple different values of θ. It is noted that the same designature operator formulation applies to both formulations with and without the source ghost, although the signature operator formulation may vary for these two cases as discussed above.

Conceptually, $H_\theta(f, k_x, k_y)$ represents a family of filters defined over a set of values of θ. For a given angular value, $H_\theta(f, k_x, k_y)$ can be understood to effectively remove the source wavelet $S_\theta(f, k_x, k_y)$ that includes signature effects and replace it with the desired wavelet $W_d(f)$. It is noted that in some embodiments, designature operators $H_\theta(f, k_x, k_y)$ may be normalized by a constant before use. Generally speaking, normalization operates to constrain the range of output values of a function to a defined range (e.g., values between 0 and 1). The particular manner of normalization and resultant range may depend on the particular application in which designature is employed. One possible normalization is to divide each $H_\theta(f, k_x, k_y)$ by a scalar such that the RMS (root-mean-square) value of $H_\theta(f, 0, 0)$ over a range of user defined frequencies (e.g., 2 Hz to 100 Hz) is equal to 1. Any suitable normalization procedure may be employed, however.

Having defined a set of designature operators $H_\theta(f, k_x, k_y)$, it is now possible to formulate a general procedure for performing designature of seismic data. One embodiment of such a procedure is as follows.

First, assuming that the set of seismic data is initially expressed in the time-space domain as a collection of seismic traces d(t,x,y), apply a 3D Fourier transform (e.g., a Fast Fourier Transform (FFT) or Discrete Fourier Transform (DFT)) to transform the seismic data to the frequency-wavenumber domain, represented as $D(f, k_x, k_y)$. In some embodiments, a 3D Non-Uniform Fourier transform may be used to transform the data to the frequency wavenumber domain in cases where the data is not regularized. In other embodiments, the seismic data may be regularized before transformation occurs. Generally speaking, irregular data relates to the manner in which data is irregularly distributed across a set of bins for representation and processing. For example, some bins may be empty (containing no seismic data) or may contain data that does not coincide with the center of a bin. Regularization addresses such issues in order to produce data that is uniformly distributed, which is a typical input assumption for many Fourier transform procedures.

Next, for each source orientation angle θ within a grid of angular values, apply the designature operator $H_\theta(f, k_x, k_y)$ to the seismic data to obtain a designatured output in the frequency-wavenumber domain over the set of angles in the grid:

$$D_\theta(f, k_x, k_y) = D(f, k_x, k_y) H_\theta(f, k_x, k_y)$$

For example, the designature operator may be applied to the seismic data on a trace-by-trace basis, or in any other suitable fashion. In one embodiment, the resultant data may be partially inverted from the frequency-wavenumber domain to the frequency-space domain, yielding $D_\theta(f,x,y)$.

As used herein, "grid" refers to a selected set of discrete points within a range of values, such that the grid forms a proper subset of the range. For example, if the range of angular values is defined from 0 to 180 degrees, a grid defined in one-degree increments would include the integer values between 0 and 180, inclusive. A grid defined in two-degree increments would include the values 0, 2, 4, . . . 180 or, alternatively, 1, 3, 5, . . . 179. Any suitable gridding of source orientation angle θ may be employed, and while the grid spacing will commonly be uniform, this is not absolutely necessary. It is noted that the term "grid" is not intended to connote or require the use of any particular data structure, whether a one-dimensional or multidimensional data structure.

Conceptually, applying the designature operator to the seismic data over a grid of angular values may be understood as projecting the seismic data through a family of filters defined at points within the grid. For any given trace within the seismic data, the designatured version of that trace may be obtained from the designatured data within the grid that is closest to the source orientation angle θ associated with that trace. It was assumed above that source orientation angle θ is captured during the course of a survey and available on a trace by trace basis (e.g., within the trace header). Let $\theta_0$ represent the actual source orientation angle for a given trace. The designatured version of that trace may then be obtained from $D_\theta(f, x\ y)$ by interpolation from the closest grid values. For example, if $\theta_0$ were 3.5 degrees for a given trace and the grid were defined in one-degree increments, then the designatured trace could be obtained by linear interpolation of $D_\theta(f,x,y)$ at the grid points corresponding to 3 and 4 degrees.

Subsequently, the designatured traces may be transformed from the frequency-space domain back to the time-space domain of the original data d(t,x,y). It is noted, however, that the particular sequence of transforms articulated here is merely one possibility. In other embodiments, designature may be performed within different domain configurations, or entirely in the time-space domain, for example.

The foregoing discussion assumes that the depth of individual source elements 210 (i.e., the z coordinate associated with an individual element $s_n(t)$) is invariant during the course of a survey. This may not be the case, however. If the depth of source elements is known to vary, this variance can be accommodated by adding an additional depth dimension to the grid, and generating designatured data $D_{\theta,z}(f,x,y)$ over a range of both angular and depth values. For example, the depth values of the grid may be obtained from the actual maximum and minimum depth values observed during a survey, gridded in increments of, e.g., 0.1 meters. The interpolation of a given trace may then be performed both with respect to the source orientation angle $\theta_0$ and source depth $z_0$ associated with the given trace.

The complexity of the designature procedure is affected in part by the number of points defined within the grid, which define the number of applications of the designature operator that need to be performed. The maximum range for source orientation angle θ is from 0 to 360 degrees. However, if source 104 is symmetric in the inline and crossline directions, this range can be reduced to 0 to 180 degrees. Moreover, in a given survey, the actual deviations of source orientation from the inline direction may be well constrained. For example, in the absence of significant feathering (e.g., due to cross-currents) and in relatively calm seas, or in a dual azimuth acquisition, the actual range of θ may fall entirely within the ranges of −10 to 10 degrees and 170 to 190 degrees. By reducing the range, the number of grid points may likewise be reduced, in turn reducing the computational complexity of the designature procedure. In some embodiments, rather than being defined a priori, the range over which the grid is defined can be determined from the actual values of source orientation angle θ observed during a given survey.

It is noted that the designature procedure discussed above enables the performance of designature in the common receiver domain, which is particularly common to surveys employing water-bottom sensors (e.g., OBS/OBN/OBC surveys). Moreover, the procedure discussed herein specifically avoids formulating the designature problem as an inverse problem (e.g., by merging the signature operator with the reverse 3D tau-p transform). Because inverse problem formulations are typically computationally intensive to solve, in at least some cases, the designature procedure discussed herein can be implemented more efficiently than approaches that formulate designature as an inverse problem.

It is additionally noted that in various embodiments, the versions of the designature procedure discussed above as well as the variants illustrated in FIGS. 3-5 and discussed below may individually correspond to a means for performing designature on recorded seismic data using a plurality of designature operators defined over a grid of designature orientation angles.

Figure 3:
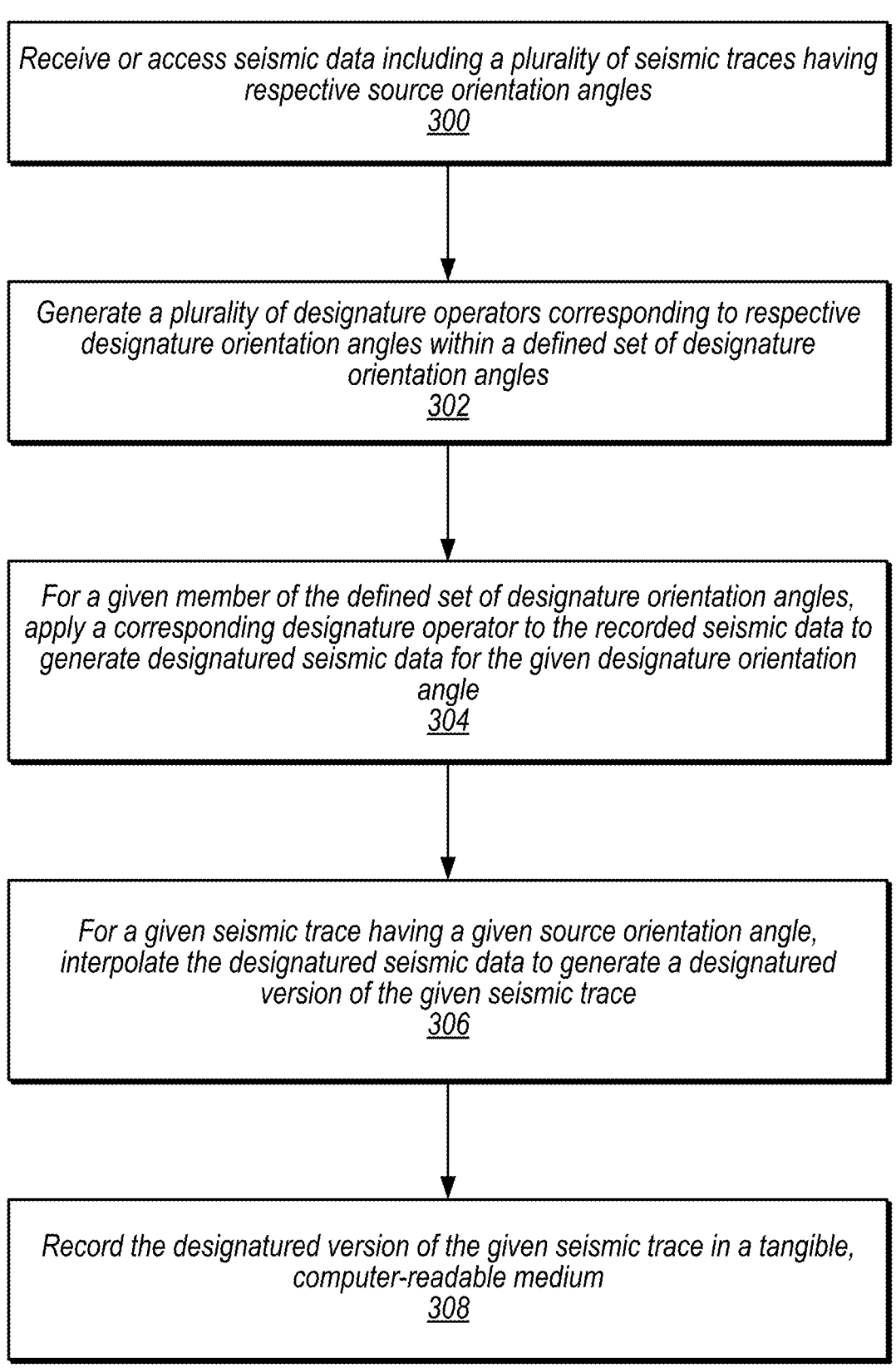
FIGS. 3-5 are flow charts illustrating respective embodiments of procedures for performing designature of seismic data.

FIG. 3 illustrates a particular embodiment of a designature procedure related to the foregoing discussion. Operation of the illustrated procedure begins in block 300, where seismic data including a plurality of seismic traces having respective source orientation angles is received or accessed. The respective source orientation angles represent deviations in seismic source orientation relative to an inline survey direction. In some embodiments, the recorded seismic data comprises common receiver data obtained from a plurality of water-bottom sensors, whereas in other embodiments, the recorded seismic data may include seismic streamer data or a combination of streamer and water-bottom sensor data.

At block 302, a plurality of designature operators is generated corresponding to respective designature orientation angles within a defined set of designature orientation angles. For example, designature operators $H_\theta(f, k_x, k_y)$ may be generated for a defined grid of orientation angles, as discussed above. In some embodiments, as discussed above, the designature operators may be configured to perform source ghost removal in addition to designature. In various embodiments, as discussed above, the defined set of designature orientation angles may be selected based upon the source orientation angles included in the recorded seismic data, may be limited to ten degrees above and below the inline survey direction (e.g., −10 to 10 degrees as well as 170 to 190 degrees), and/or may include angles defined according to an interval of one or two degrees.

At block 304, for a given member of the defined set of designature orientation angles, a corresponding designature operator is applied to the recorded seismic data to generate designatured seismic data for the given designature orientation angle. For example, as discussed above, for each source orientation angle θ within a grid of angular values, the designature operator $H_\theta(f, k_x\ k_y)$ may be applied to the seismic data to obtain a designatured output. In some embodiments, the recorded seismic data comprises time-space domain data including a time dimension and one or more spatial dimensions, and prior to applying designature operators, the recorded seismic data may be transformed to a frequency-wavenumber domain prior to applying designature operators. For example, Fourier transform techniques may be applied as discussed above to generate $D(f, k_x, k_y)$ from d(t,x,y).

At block 306, for a given seismic trace having a given source orientation angle, the designatured seismic data is interpolated to generate a designatured version of the given seismic trace. In some embodiments as discussed above, prior to interpolating the designatured seismic data for the given seismic trace, the designatured seismic data may be transformed from the frequency-wavenumber domain to a frequency-space domain, and subsequent to interpolating the designatured seismic data for the given seismic trace, the designatured version of the given seismic trace may be transformed from the frequency-space domain to the time-space domain.

As discussed above, in some embodiments source depth may also be interpolated. In some such embodiments, the recorded seismic data additionally includes indications of source depth values, where the given seismic trace has a given source depth value. Here, the plurality of designature operators is generated for a defined set of depth values in addition to the defined set of designature orientation angles, and applying designature operators to the recorded seismic data is performed based on depth value and designature orientation angle. Moreover, in some such embodiments, interpolating the designatured seismic data for the given seismic trace comprises interpolating with respect to the given source depth value and the given source orientation angle.

At block 308, the designatured version of the given seismic trace is stored in a tangible, computer-readable medium.

Figure 4:
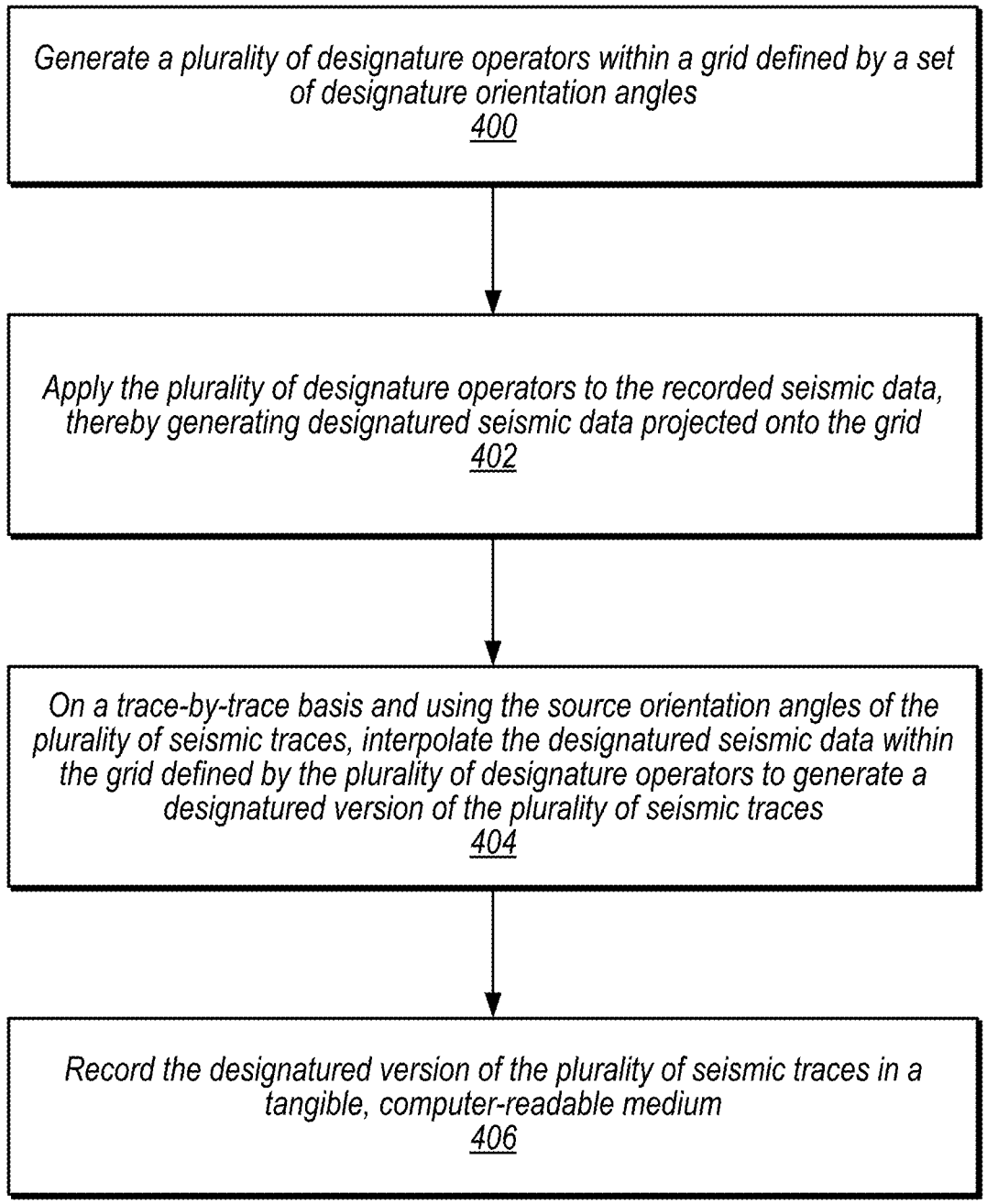

FIG. 4 illustrates another particular embodiment of a designature procedure related to the foregoing discussion. The procedure is a specific improvement on a technological process for producing an image of subsurface geological features based on recorded seismic survey data, where the process includes receiving or accessing recorded seismic data that includes a plurality of seismic traces having respective source orientation angles, and where the respective source orientation angles represent deviations in seismic source orientation relative to an inline survey direction. As noted above and with respect to block 300, in various embodiments the recorded seismic data comprises common receiver data obtained from a plurality of water-bottom sensors, seismic streamers, or combinations thereof.

Operation of the procedure begins in block 400, where a plurality of designature operators is generated within a grid defined by a set of designature orientation angles. For example, designature operators $H_\theta(f, k_x, k_y)$ may be generated for a defined grid of orientation angles, as discussed above. As noted with respect to block 302 of FIG. 3, in some embodiments the designature operators may be configured to perform source ghost removal in addition to designature. The discussion of designature orientation angles given with respect to block 302 also applies to block 400, in various embodiments. Moreover, the designature orientation angles need not be regularly spaced in all embodiments.

At block 402, the plurality of designature operators is applied to the recorded seismic data, thereby generating designatured seismic data projected onto the grid. For example, as discussed above, for each source orientation angle θ within a grid of angular values, the designature operator $H_\theta(f, k_x, k_y)$ may be applied to the seismic data, effectively projecting the data within a family of filters defined by the designature operators to obtain a designatured output. The discussion of domain representations and transforms given with respect to block 304 of FIG. 3 also applies to block 402, in various embodiments.

At block 404, on a trace-by-trace basis and using the source orientation angles of the plurality of seismic traces, the designatured seismic data is interpolated within the grid defined by the plurality of designature operators to generate a designatured version of the plurality of seismic traces. In some embodiments as discussed above, prior to interpolating the designatured seismic data for the given seismic trace, the designatured seismic data may be transformed from the frequency-wavenumber domain to a frequency-space domain, and subsequent to interpolating the designatured seismic data for the given seismic trace, the designatured version of the given seismic trace may be transformed from the frequency-space domain to the time-space domain. The discussion of interpolation of source depth given above with respect to block 306 of FIG. 3 also applies to block 404, in various embodiments.

At block 406, the designatured version of the plurality of seismic traces is recorded in a tangible, computer-readable medium.

Figure 5:
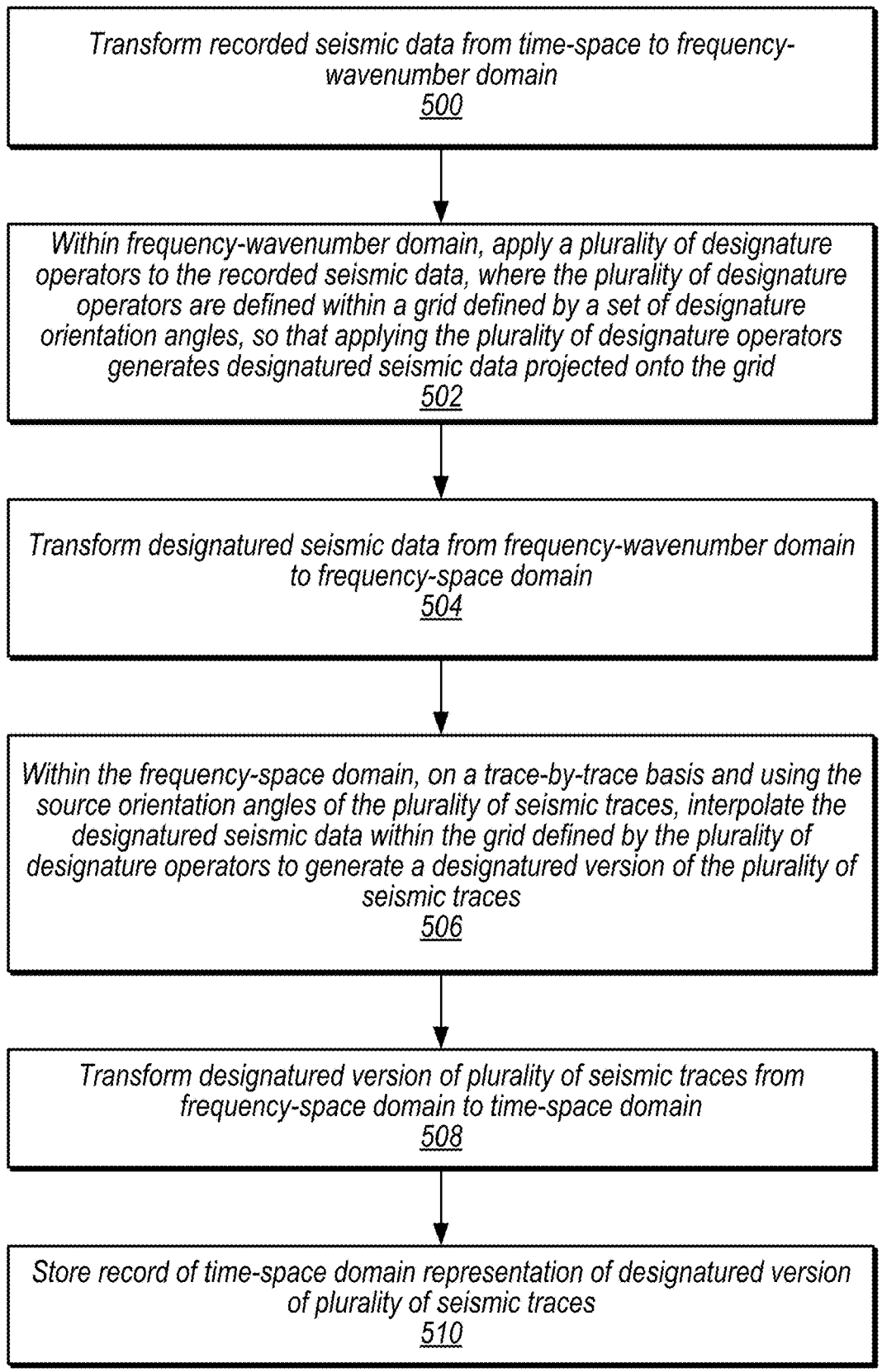

FIG. 5 illustrates another particular embodiment of a designature procedure related to the foregoing discussion. The illustrated procedure is configured to perform designature of recorded seismic data including a plurality of seismic traces having respective source orientation angles, where the respective source orientation angles represent deviations in seismic source orientation relative to an inline survey direction. As noted above and with respect to blocks 300 and 400 of FIGS. 3 and 4, respectively, in various embodiments the recorded seismic data comprises common receiver data obtained from a plurality of water-bottom sensors, seismic streamers, or combinations thereof.

Operation begins in block 500 with transformation of the recorded seismic data from a time-space domain to a frequency-wavenumber domain. For example, Fourier transform techniques may be applied to transform time-space data d(t,x,y) to frequency-wavenumber data $D(f, k_x, k_y)$, as discussed above.

At block 502, within the frequency-wavenumber domain, a plurality of designature operators is applied to the recorded seismic data, wherein the plurality of designature operators are defined within a grid defined by a set of designature orientation angles, so that applying the plurality of designature operators generates designatured seismic data projected onto the grid. As noted with respect to block 302 of FIG. 3, in some embodiments the designature operators may be configured to perform source ghost removal in addition to designature. The discussion of designature orientation angles given with respect to block 302 also applies to block 502, in various embodiments.

At block 504, the designatured seismic data is transformed from the frequency-wavenumber domain to a frequency-space domain. For example, as discussed above, designatured data $D_\theta(f, k_x, k_y)$ may be partially inverted to yield $D_\theta(f,x,y)$.

At block 506, within the frequency-space domain, on a trace-by-trace basis and using the source orientation angles of the plurality of seismic traces, the designatured seismic data is interpolated within the grid defined by the plurality of designature operators to generate a designatured version of the plurality of seismic traces. The discussion of interpolation of source depth given above with respect to block 306 of FIG. 3 also applies to block 506, in various embodiments.

At block 508, the designatured version of the plurality of seismic traces is transformed from the frequency-space domain to the time-space domain. For example, a one-dimensional inverse Fourier transform may be applied to yield $D_\theta(f,x,y)$ to yield $d_{designatured}(t,x,y)$.

At block 510, a record of the time-space domain representation of the designatured version of the plurality of seismic traces is stored. For example, the record may be stored on a computer-readable medium, discussed below, for further analysis.

Designature Examples

A version of the designature methodology discussed above has been tested on synthetic survey data that simulates analysis of an actual survey. The synthetic survey was configured to simulate a survey over a grid of water-bottom sensors that included 320 sublines (parallel to the inline survey direction) spaced 12.5 meters apart and 481 crosslines spaced 12.5 meters apart. The synthetic earth model used to simulate reflectivity included three flat layers. The seismic source included 34 individual airguns as source elements, and simulated survey data was generated with the source towed at two different source orientation angles: 0 degrees and 170 degrees.

Figure 6:
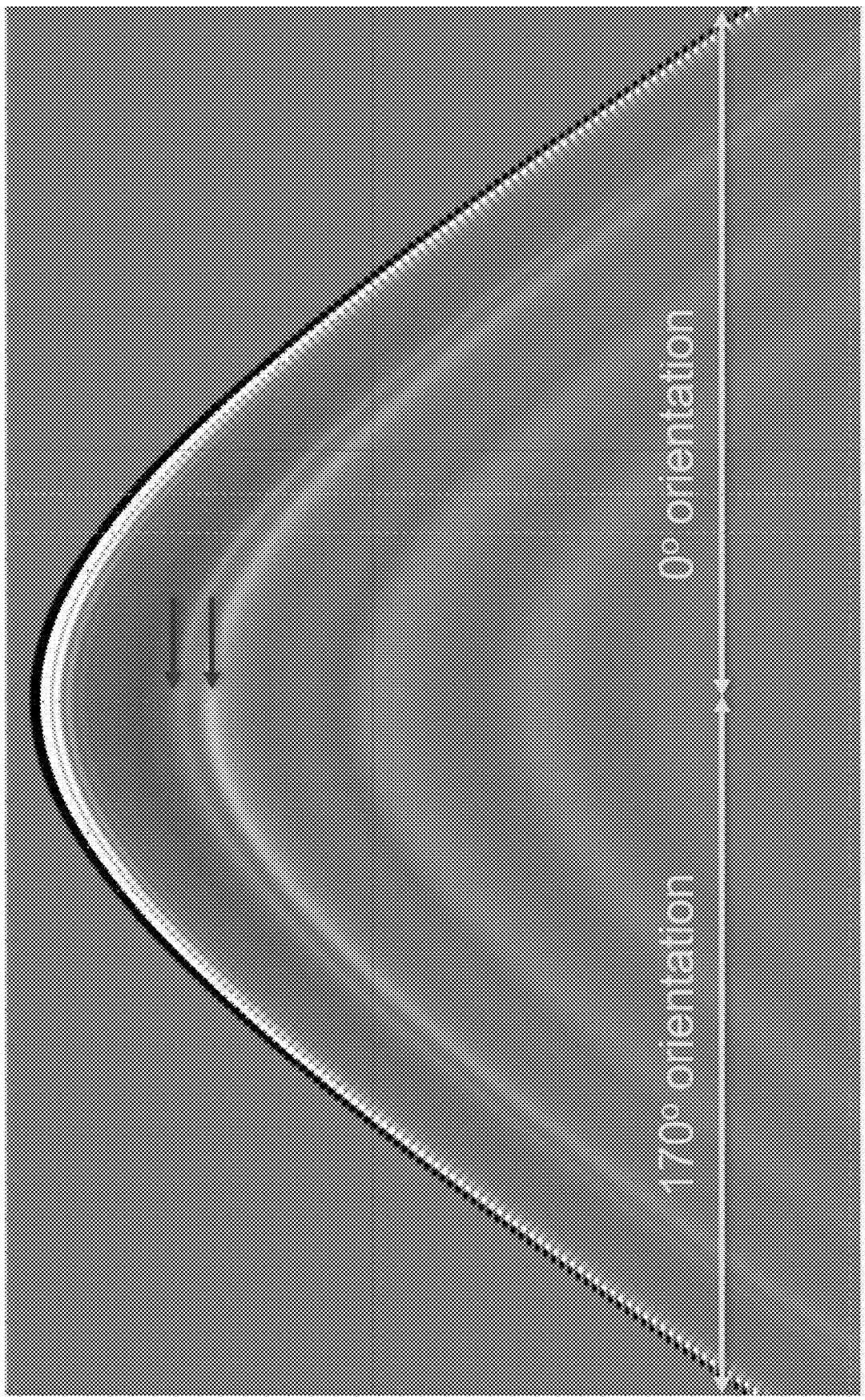
FIG. 6 illustrates simulated survey data used as an input to a simulation of a designature procedure.

FIG. 6 illustrates a simulated cross-line section from a single receiver node that was used as an input to the designature procedure. It includes a portion of the simulated results that were obtained with a 0 degree source orientation angle shown in the right half, and a 170 degree source orientation angle shown in the left half. In FIGS. 6-9, the x-axis denotes distance in the subline direction, and the y-axis denotes time.

Figure 7:
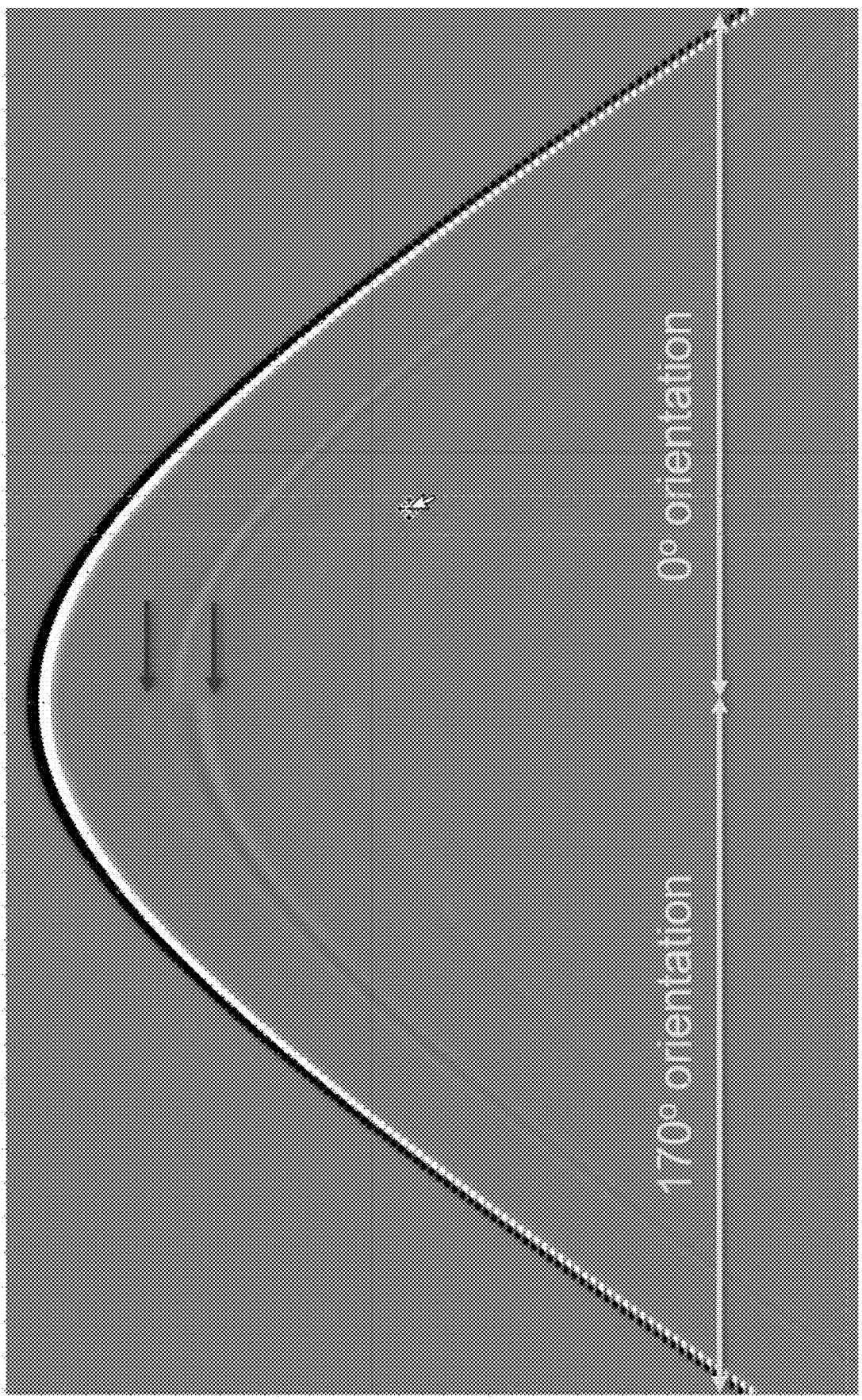
FIG. 7 illustrates the result of processing the data of FIG. 6 using a 1D designature process.

FIG. 7 illustrates the result of processing the data shown in FIG. 6 using a conventional 1D designature process. This approach does not take directionality into consideration and illustrates a baseline scenario against which the directional designature approach discussed here may be compared. In particular, in the center region of FIG. 7 denoted by arrows, it can be seen that the nondirectional 1D process generates significant discontinuities at the transition between 0 degree and 170 degree data.

Figure 8:
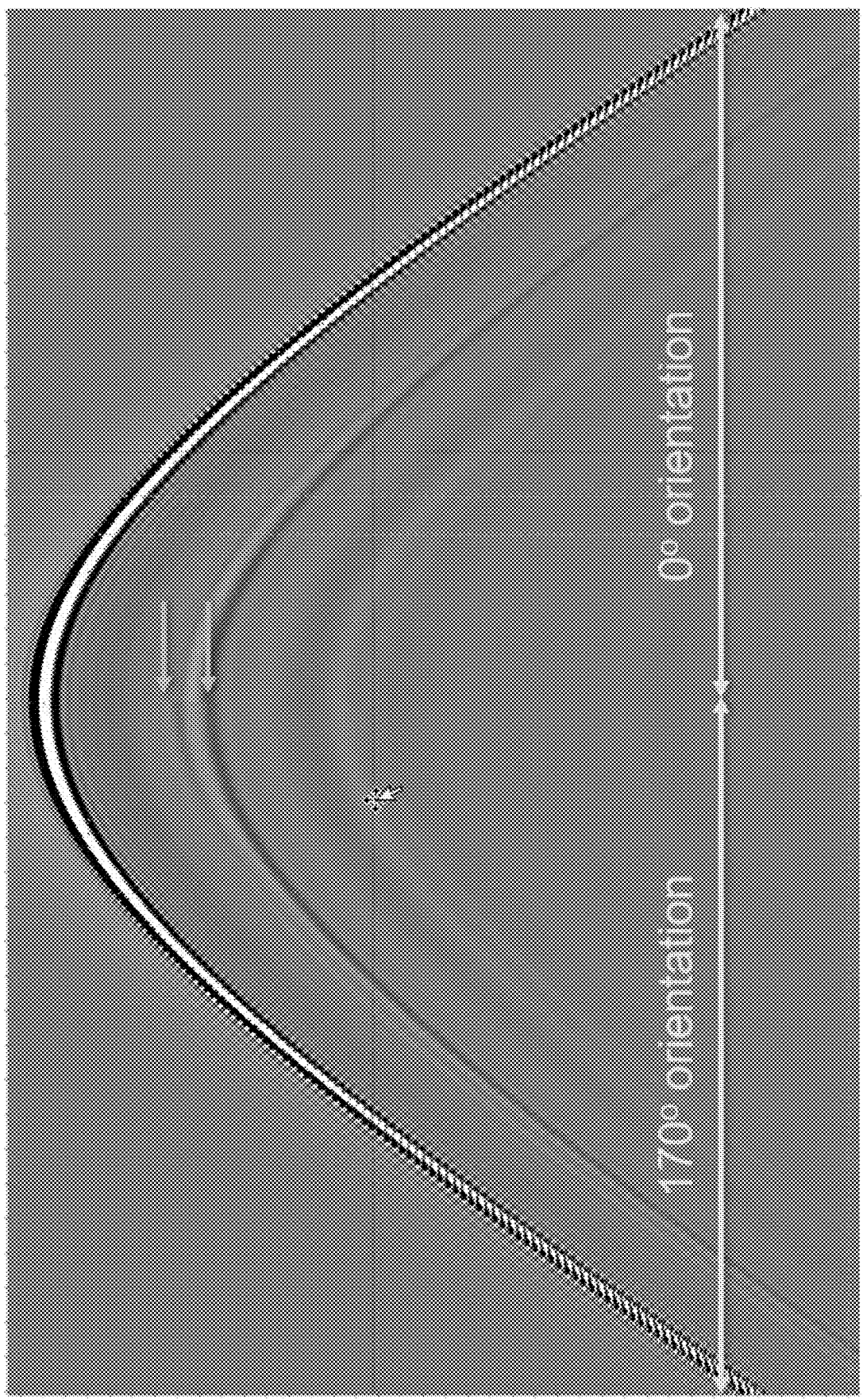
FIG. 8 illustrates the result of processing the data of FIG. 6 using a 3D designature procedure discussed herein, without deghosting.
Figure 9:
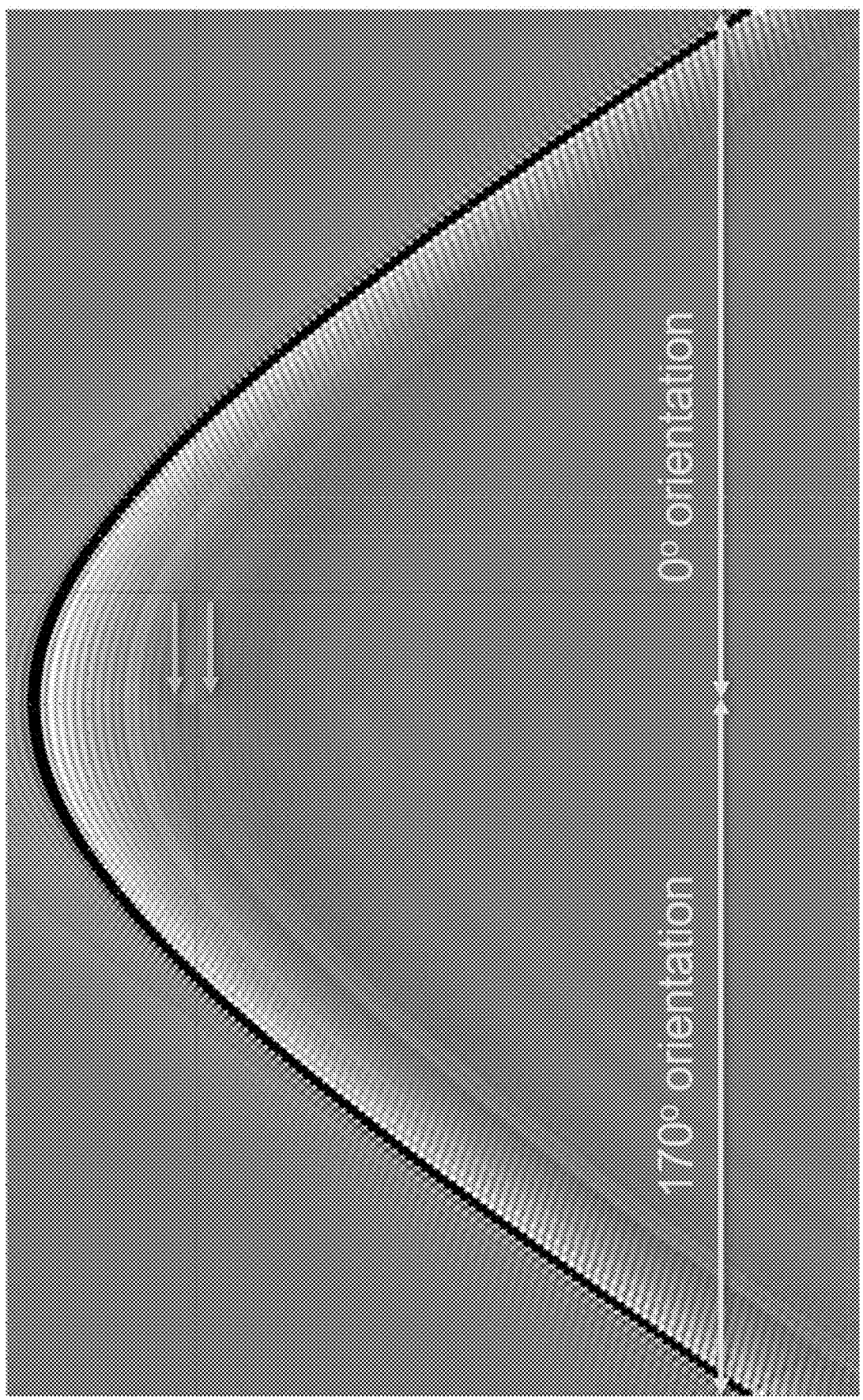
FIG. 9 illustrates the result of processing the data of FIG. 6 using a 3D designature procedure discussed herein, with deghosting.

FIG. 8 illustrates the result of processing the data shown in FIG. 6 using the 3D directional designature procedure discussed above, without deghosting. FIG. 9 illustrates the result of processing the data shown in FIG. 6 using the 3D directional designature procedure discussed above, as formulated to include deghosting. In both cases, it can be seen that the discontinuities shown in FIG. 7 for the nondirectional designature process are significantly reduced in the directional designature cases shown in FIGS. 8-9.

Example Computing System

Various operations described herein may be implemented by a computing device configured to execute program instructions that specify the operations. Similarly, various operations may be performed by circuitry designed or configured to perform the operations. In some embodiments, a non-transitory computer-readable medium has program instructions stored thereon that are capable of causing various operations described herein. As used herein, the term "processor," "processing unit," or "processing element" refers to various elements or combinations of elements configured to execute program instructions. Processing elements include, for example, circuits such as an ASIC (Application Specific Integrated Circuit), custom processing circuits or gate arrays, portions or circuits of individual processor cores, entire processor cores, individual processors, programmable hardware devices such as a field programmable gate array (FPGA) or the like, and/or larger portions of systems that include multiple processors, as well as any combinations thereof.

Figure 10:
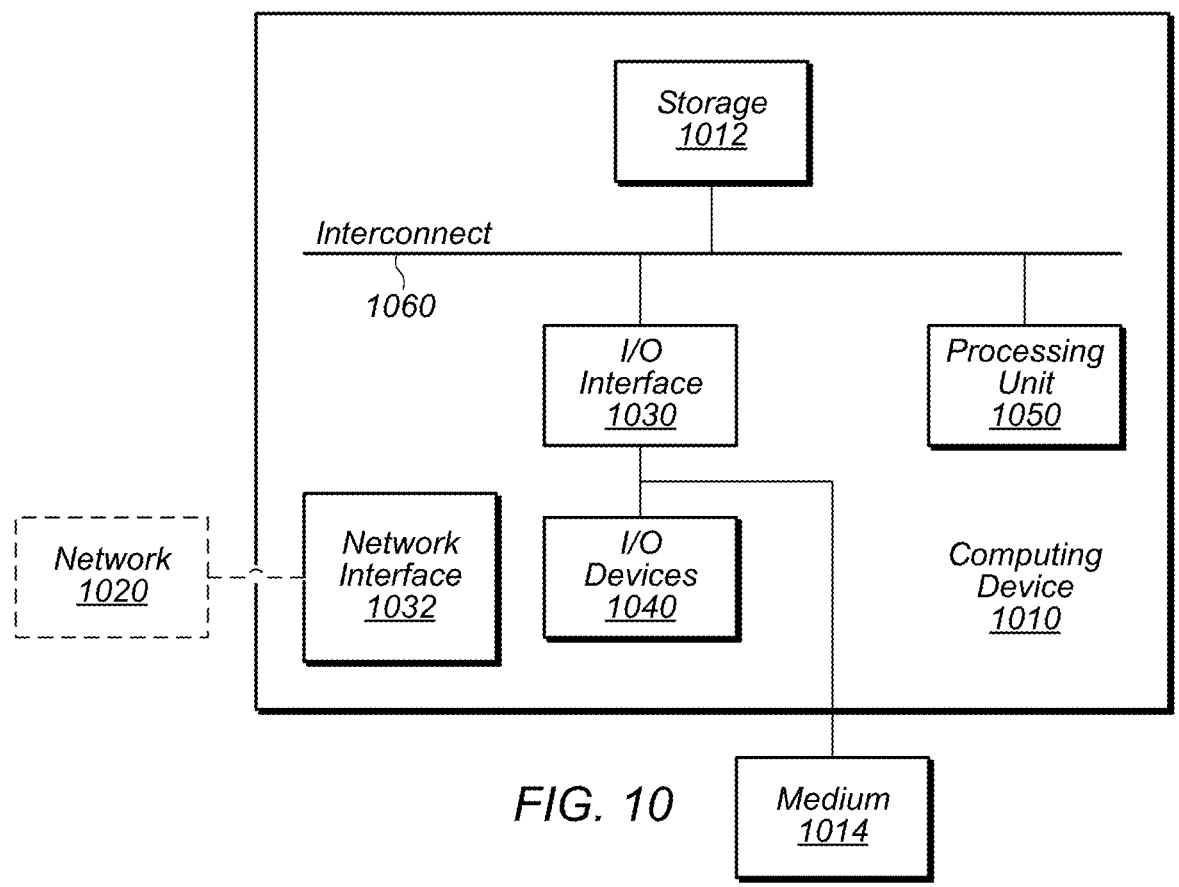
FIG. 10 shows a block diagram illustrating an example computing system.

Turning now to FIG. 10, a block diagram of an example computing device (which may also be referred to as a computing system) 1010 is depicted, according to some embodiments. Computing device 1010 may be used to implement various portions of this disclosure. Computing device 1010 is one example of a device that may be used as a mobile device, a server computing system, a client computing system, a distributed computing system, or any other computing system implementing portions of this disclosure. It is noted that in various configurations, computing system 1010, when programmed to perform a specific algorithm, may constitute a means for performing a function for which the specific algorithm is a corresponding structure.

Computing device 1010 may be any suitable type of device, including, but not limited to, a personal computer system, desktop computer, laptop or notebook computer, mobile phone, mainframe computer system, supercomputer, web server, workstation, or network computer. As shown, computing device 1010 includes processing unit 1050, storage subsystem 1012, and input/output (I/O) interface 1030 coupled via interconnect 1060 (e.g., a system bus). I/O interface 1030 may be coupled to one or more I/O devices 1040. Computing device 1010 further includes network interface 1032, which may be coupled to network 1020 for communications with, for example, other computing devices. Other bus architectures and subsystem configurations may also be employed.

As described above, processing unit 1050 includes one or more processors. In some embodiments, processing unit 1050 includes one or more coprocessor units. In some embodiments, multiple instances of processing unit 1050 may be coupled to interconnect 1060. Processing unit 1050 (or each processor within processing unit 1050) may contain a cache or other form of on-board memory. In some embodiments, processing unit 1050 may be implemented as a general-purpose processing unit, and in other embodiments it may be implemented as a special purpose processing unit (e.g., an ASIC). In general, computing device 1010 is not limited to any particular type of processing unit or processor subsystem.

Storage subsystem 1012, which may encompass system memory and/or virtual memory, is usable by processing unit 1050 (e.g., to store instructions executable by and data used by processing unit 1050). Storage subsystem 1012 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 1012 may consist solely of volatile memory in some embodiments. Storage subsystem 1012 may store program instructions executable by computing device 1010 using processing unit 1050, including program instructions executable to cause computing device 1010 to implement the various techniques disclosed herein. In at least some embodiments, storage subsystem 1012 and/or medium 1014 may represent an example of a non-transitory computer-readable or machine-readable medium that may store executable instructions.

In the illustrated embodiment, computing device 1010 further includes non-transitory computer-readable medium 1014 as a possibly distinct element from storage subsystem 1012. As shown, computer-readable medium 1014 is configured as a peripheral or I/O device accessible via I/O interface 1030, although other interconnect configurations are possible. In various embodiments, non-transitory medium 1014 may include persistent, tangible storage such as disk, nonvolatile memory, tape, optical media, holographic media, or other suitable types of storage. In some embodiments, non-transitory medium 1014 may be employed to store and transfer geophysical data, and may be physically separable from computing device 1010 to facilitate transport. Accordingly, in some embodiments, medium 1014 may constitute the geophysical data product discussed above. Although shown to be distinct from storage subsystem 1012, in some embodiments, non-transitory medium 1014 may be integrated within storage subsystem 1012. Embodiments of non-transitory medium 1014 and/or storage subsystem 1012 may correspond to a means for storing recorded seismic data including a plurality of seismic traces having respective source orientation angles, wherein the respective source orientation angles represent deviations in seismic source orientation relative to an inline survey direction.

I/O interface 1030 may represent one or more interfaces and may be any of various types of interfaces configured to couple to and communicate with other devices, according to various embodiments. In some embodiments, I/O interface 1030 is a bridge chip from a front-side to one or more back-side buses. I/O interface 1030 may be coupled to one or more I/O devices 1040 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.). In some embodiments, the geophysical data product discussed above may be embodied within one or more of I/O devices 1040.

In some embodiments, a geophysical data product may be manufactured according to techniques described in this disclosure. A geophysical data product may comprise a computer-readable, non-transitory medium having geophysical data stored on the medium, including, e.g., raw streamer data, processed streamer data, two- or three-dimensional maps based on streamer data, or other suitable representations. Some non-limiting examples of computer-readable media may include tape reels, hard drives, CDs, DVDs, flash memory, print-outs, etc., although any tangible computer-readable medium may be employed to create the geophysical data product. In some embodiments, raw analog data from streamers may be stored in the geophysical data product. In other instances, as noted above, the data may first be digitized and/or conditioned prior to being stored in the geophysical data product. In yet other instances, the data may be fully processed into a two- or three-dimensional map of the various geophysical structures, or another suitable representation, before being stored in the geophysical data product. The geophysical data product may be manufactured during the course of a survey (e.g., by equipment on a vessel) and then, in some instances, transferred to another location for geophysical analysis, although analysis of the geophysical data product may occur contemporaneously with survey data collection. In other instances, the geophysical data product may be manufactured (or remanufactured) subsequent to survey completion, e.g., during the course of analysis of the survey.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "apparatus configured to traverse a streamer" is intended to cover, for example, a mechanism that performs this function during operation, even if the mechanism in question is not currently being used (e.g., a power supply is not connected to it, or no streamer is currently present). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function, and may, after programming, be "configured to" perform that function.

Reciting in the appended claims that a structure is "configured to" perform one or more tasks is expressly intended not to invoke 35 U.S.C. § 112(f) for that claim element. Only those claims expressly using the "means for [performing a function]" construct are intended to invoke Section 112(f) for that claim element.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents (such as "one or more" or "at least one") unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Moreover, where flow charts or flow diagrams are used to illustrate methods of operation, it is specifically contemplated that the illustrated operations and their ordering demonstrate only possible implementations and are not intended to limit the scope of the claims. It is noted that alternative implementations that include more or fewer operations, or operations performed in a different order than shown, are possible and contemplated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure. Although various advantages of this disclosure have been described, any particular embodiment may incorporate some, all, or even none of such advantages.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims, and features from respective independent claims may be combined in any appropriate manner and not merely in the specific combinations enumerated in the appended claims.

What is claimed is:

1. A non-transitory machine-readable medium that stores instructions executable by one or more processors to perform operations comprising:
   receiving or accessing recorded seismic data including plural seismic traces, each of the plural seismic traces associated with a respective source orientation angle;
   generating plural designature operators, each of the plural designature operators corresponding to a respective designature orientation angle within a defined set of designature orientation angles, wherein the defined set of designature orientation angles comprises a grid of angular values;
   for a given designature orientation angle in the defined set of designature orientation angles, applying a corresponding designature operator to the recorded seismic data to generate designatured seismic data for the given designature orientation angle;
   for a given seismic trace associated with a given source orientation angle, generating a designatured version of the given seismic trace by at least interpolating between values of the designatured seismic data that correspond to points in the grid of angular values closest to the given source orientation angle, such that the designatured version of the given seismic trace represents the given seismic trace after correction for anisotropy present in a signal as emitted by a seismic source associated with the given seismic trace;
   recording the designatured version of the given seismic trace in a tangible, computer-readable medium; and
   generating an image of subsurface geological features based at least in part on the designatured version of the given seismic trace;
   whereby the operations remove signature effects from the seismic data caused by anisotropy of the seismic source and enable performance of designature in a common receiver domain to generate the designatured version of the given seismic trace from the values of the designatured seismic data corresponding to points in the grid of angular values closest to the given source orientation angle associated with the given seismic trace.

2. The non-transitory machine-readable medium of claim 1, wherein the recorded seismic data comprises common receiver data obtained from a plurality of water-bottom sensors.

3. The non-transitory machine-readable medium of claim 1, wherein the recorded seismic data comprises time-space domain data including a time dimension and one or more spatial dimensions, and wherein the operations further comprise transforming the recorded seismic data to a frequency-wavenumber domain prior to applying the designature operators.

4. The non-transitory machine-readable medium of claim 3, further comprising:
   prior to interpolating the designatured seismic data for the given seismic trace, transforming the designatured seismic data from the frequency-wavenumber domain to a frequency-space domain; and
   subsequent to interpolating the designatured seismic data for the given seismic trace, transforming the designatured version of the given seismic trace from the frequency-space domain to the time-space domain.

5. The non-transitory machine-readable medium of claim 1, wherein: the recorded seismic data additionally includes indications of source depth values, and the given seismic trace corresponds to a given source depth value;
   the grid of angular values further comprises a depth dimension;
   the plural designature operators are generated for a defined set of depth values in addition to the defined set of designature orientation angles;
   applying the corresponding designature operator is based on depth value and designature orientation angle; and
   interpolating the designatured seismic data for the given seismic trace further comprises interpolating between values of the designatured seismic data that correspond to points in the grid of angular values that are closest to the given source depth value.

6. The non-transitory machine-readable medium of claim 1, wherein the defined set of designature orientation angles is selected based upon the source orientation angles included in the recorded seismic data.

7. The non-transitory machine-readable medium of claim 1, wherein the defined set of designature orientation angles is limited to a first range between +ten degrees and −ten degrees relative to an inline survey direction and a second range between 170 degrees and 190 degrees relative to the inline survey direction.

8. The non-transitory machine-readable medium of claim 1, wherein the grid of angular values is defined in one- or two-degree increments.

9. The non-transitory machine-readable medium of claim 1, wherein the plural designature operators are further configured to perform source ghost removal from the recorded seismic data in addition to removing a source signature from the recorded seismic data, wherein a source ghost comprises source energy reflected from a sea surface prior to being received by a seismic sensor.

10. A method, comprising:
    receiving or accessing recorded seismic data including plural seismic traces, each of the plural seismic traces associated with a respective source orientation angle;
    generating plural designature operators, each of the plural designature operators corresponding to a respective designature orientation angle within a defined set of designature orientation angles, wherein the defined set of designature orientation angles comprises a grid of angular values;
    for a given designature orientation angle in the defined set of designature orientation angles, applying a corresponding designature operator to the recorded seismic data to generate designatured seismic data for the given designature orientation angle;
    for a given seismic trace associated with a given source orientation angle, generating a designatured version of the given seismic trace by at least interpolating between values of the designatured seismic data that correspond to points in the grid of angular values closest to the given source orientation angle, such that the designatured version of the given seismic trace represents the given seismic trace after correction for anisotropy present in a signal as emitted by a seismic source associated with the given seismic trace;

recording the designatured version of the given seismic trace in a tangible, computer-readable medium; and generating an image of subsurface geological features based at least in part on the designatured version of the given seismic trace;

whereby the method removes signature effects from the seismic data caused by anisotropy of the seismic source and enables performance of designature in a common receiver domain to generate the designatured version of the given seismic trace from the values of the designatured seismic data corresponding to points in the grid of angular values closest to the given source orientation angle associated with the given seismic trace.

11. The method of claim 10, wherein the recorded seismic data comprises common receiver data obtained from a plurality of water-bottom sensors.

12. The method of claim 10, wherein the recorded seismic data comprises time-space domain data including a time dimension and one or more spatial dimensions, and wherein the process further comprises transforming the recorded seismic data to a frequency-wavenumber domain prior to applying the designature operators.

13. The method of claim 12, further comprising:
prior to interpolating the designatured seismic data for the given seismic trace, transforming the designatured seismic data from the frequency-wavenumber domain to a frequency-space domain; and
subsequent to interpolating the designatured seismic data for the given seismic trace, transforming the designatured version of the given seismic trace from the frequency-space domain to the time-space domain.

14. The method of claim 10, wherein:
the recorded seismic data additionally includes indications of source depth values, and the given seismic trace corresponds to a given source depth value;
the grid of angular values further comprises a depth dimension;
the plural designature operators are generated for a defined set of depth values in addition to the defined set of designature orientation angles;
applying the corresponding designature operator is based on depth value and designature orientation angle; and
interpolating the designatured seismic data for the given seismic trace further comprises interpolating between values of the designatured seismic data that correspond to points in the grid of angular values that are closest to the given source depth value.

15. The method of claim 10, wherein the defined set of designature orientation angles is selected based upon the source orientation angles included in the recorded seismic data.

16. The method of claim 10, wherein the defined set of designature orientation angles is limited to a first range between +ten degrees and −ten degrees relative to an inline survey direction and a second range between 170 degrees and 190 degrees relative to the inline survey direction.

17. The method of claim 10, wherein the grid of angular values is defined in one- or two-degree increments.

18. The method of claim 10, wherein the plural designature operators are further configured to perform source ghost removal from the recorded seismic data in addition to removing a source signature from the recorded seismic data, wherein a source ghost comprises source energy reflected from a sea surface prior to being received by a seismic sensor.

19. A system, comprising:
a memory that stores instructions; and
one or more processors configured to execute the instructions to perform operations that perform designature of recorded seismic data including plural seismic traces associated with respective source orientation angles, wherein the respective source orientation angles represent deviations in seismic source orientation relative to an inline survey direction, the operations including:
receiving or accessing the recorded seismic data including the plural seismic traces, each of the plural seismic traces associated with a respective source orientation angle;
generating plural designature operators, each of the plural designature operators corresponding to a respective designature orientation angle within a defined set of designature orientation angles, wherein the defined set of designature orientation angles comprises a grid of angular values;
for a given designature orientation angle in the defined set of designature orientation angles, applying a corresponding designature operator to the recorded seismic data to generate designatured seismic data for the given designature orientation angle;
for a given seismic trace associated with a given source orientation angle, generating a designatured version of the given seismic trace by at least interpolating between values of the designatured seismic data that correspond to points in the grid of angular values closest to the given source orientation angle, such that the designatured version of the given seismic trace represents the given seismic trace after correction for anisotropy present in a signal as emitted by a seismic source associated with the given seismic trace;
recording the designatured version of the given seismic trace in a tangible, computer-readable medium; and
generating an image of subsurface geological features based at least in part on the designatured version of the given seismic trace;
whereby the operations remove signature effects from the seismic data caused by anisotropy of the seismic source and enable performance of designature in a common receiver domain to generate the designatured version of the given seismic trace from the values of the designatured seismic data corresponding to points in the grid of angular values closest to the given source orientation angle associated with the given seismic trace.

20. The system of claim 19, wherein the recorded seismic data comprises common receiver data obtained from a plurality of water-bottom sensors.

21. The system of claim 19, wherein:
the recorded seismic data additionally includes indications of source depth values, and the given seismic trace corresponds to a given source depth value;
the grid of angular values further comprises a depth dimension;
the plural designature operators are generated for a defined set of depth values in addition to the defined set of designature orientation angles;
applying the corresponding designature operator is based on depth value and designature orientation angle; and interpolating the designatured seismic data for the given seismic trace further comprises interpolating between values of the designatured seismic data that correspond to points in the grid of angular values that are closest to the given source depth value.

22. The system of claim 19, wherein the defined set of designature orientation angles is selected based upon the source orientation angles included in the recorded seismic data.

23. The system of claim 19, wherein the defined set of designature orientation angles is limited to a first range between +ten degrees and −ten degrees relative to the inline survey direction and a second range between 170 degrees and 190 degrees relative to the inline survey direction.

24. The system of claim 19, wherein the grid of angular values is defined in one- or two-degree increments.

25. The system of claim 19, wherein the plural designature operators are further configured to perform source ghost removal from the recorded seismic data in addition to removing a source signature from the recorded seismic data, wherein a source ghost comprises source energy reflected from a sea surface prior to being received by a seismic sensor.

* * * * *